United States Patent

Umbach et al.

[11] Patent Number: 4,479,612
[45] Date of Patent: Oct. 30, 1984

[54] RETRACTABLE GLYCOL SPRAY NOZZLE

[76] Inventors: Newell L. Umbach, 668 Longview, Douglas, Wyo. 82633; William J. Boyer, 3751 E. 19th, Casper, Wyo. 82601

[21] Appl. No.: 427,527

[22] Filed: Sep. 28, 1982

[51] Int. Cl.³ ............................................. B05B 13/06
[52] U.S. Cl. ................................ 239/280; 134/167 R; 134/177; 239/587
[58] Field of Search .......................... 134/167 R, 177; 239/200, 273, 276, 280–283, 587, 588

[56] References Cited

U.S. PATENT DOCUMENTS 2,728,649 12/1955 Kowenstrot et al. .......... 239/200 X
3,791,394 2/1974 Hammelmann ................. 134/177 X
3,804,338 4/1974 Williams et al. ............... 239/203 X Primary Examiner—Andres Kashnikow
Attorney, Agent, or Firm—Harvey B. Jacobson

[57] ABSTRACT

An elongated tubular wand is provided including an inlet end portion and an outlet end portion equipped with a spray discharge nozzle. A mounting sleeve is loosely disposed over the wand outlet end portion with the latter being slidingly reciprocal relative to the former. Seal structure is provided establishing a fluid tight sliding seal between the external surfaces of the wand and the internal surfaces of the mounting sleeve. A tubular full opening and closing valve is sealingly mounting on the end of the mounting sleeve corresponding to the wand outlet end portion and through which the latter may be lengthwise extended and retracted. The valve includes structure for support from a tubular inlet fitting opening into a closed pipe section or other closed vessel and the inlet end portion of the wand includes fluid inlet structure for sealed communication with a source of fluid under pressure.

2 Claims, 3 Drawing Figures

RECTRACTABLE GLYCOL SPRAY NOZZLE

BACKGROUND OF THE INVENTION

Glycol spray nozzles are conventionally used within a pressurized vessel such as a heat exchanger or pipe in a natural gas processing plant. The spray nozzles are subject to wear and must be replaced at frequent intervals. However, the pressure within the vessel with which the nozzle is operatively associated prevents the nozzle from being replaced by conventional methods without depressurizing the vessel. Accordingly, a need exists for structure by which a glycol nozzle may be replaced within a pressurized vessel while the vessel remains under pressure.

Examples of spray nozzles and spray nozzle mounting structures including some of the general structural and operational features of the instant invention are disclosed in U.S. Pat. Nos. 2,965,308, 3,169,707, 3,444,869, 3,696,825, 3,791,394, and 3,804,338.

BRIEF DESCRIPTION OF THE INVENTION

The retractable glycol spray nozzle of the instant invention includes an elongated tubular wand supported from a mounting sleeve and relative to which the wand is projectable and retractable. The mounting sleeve includes seal structure forming a fluid tight seal between the sleeve and the wand relative to which the wand may be rotated and longitudinally shifted. The sleeve supports a full opening and full closing valve from the end thereof relative to which the nozzle end of the wand may be extended and retracted and the body of the valve includes structure for establishing a fluid tight threaded connection between the valve body and the portions of a pressurized vessel defining a port opening thereinto. In addition, the end of the wand remote from the nozzle equipped end thereof includes glycol inlet structure.

By the above mentioned structure the nozzle equipped end of the wand may be projected into the associated pressurized vessel and glycol may be sprayed into the vessel through the nozzle on the projected end f the nozzle. When it becomes necessary to replace the ozzle, the wand is retracted an amount sufficient to retract the spray nozzle through the full opening and closing valve, the valve is closed and the wand is removed for replacement of the nozzle. After the nozzle has been replaced, the wand may be remounted, the valve may be opened and the end of the wand with the replacement nozzle thereon may again be projected through the valve and into the interior of the associated vessel.

The main object of this invention is to provide a glycol spray nozzle for a pressurized vessel and constructed in a manner whereby the spray nozzle may be removed and replaced while maintaining the associated vessel under pressure.

Another object of this invention is to provide a spray nozzle assembly including screw jack structure for projecting and retracting the nozzle equipped wand thereof in a controlable manner while the wand is acted upon by the pressure within the associated vessel.

Yet another important object of this invention is to provide a spray nozzle assembly constructed in a manner whereby it may readily adapted for use in conjunction with various types of pressurized vessels and pipes.

A final object of this invention to be specifically enumerated herein is to provide a retractable spray nozzle assembly in accordance with the preceding objects and which will conform to conventional forms of manufacture, be of simple construction and easy to use so as to provide a device that will be economically feasible, long lasting and relative trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
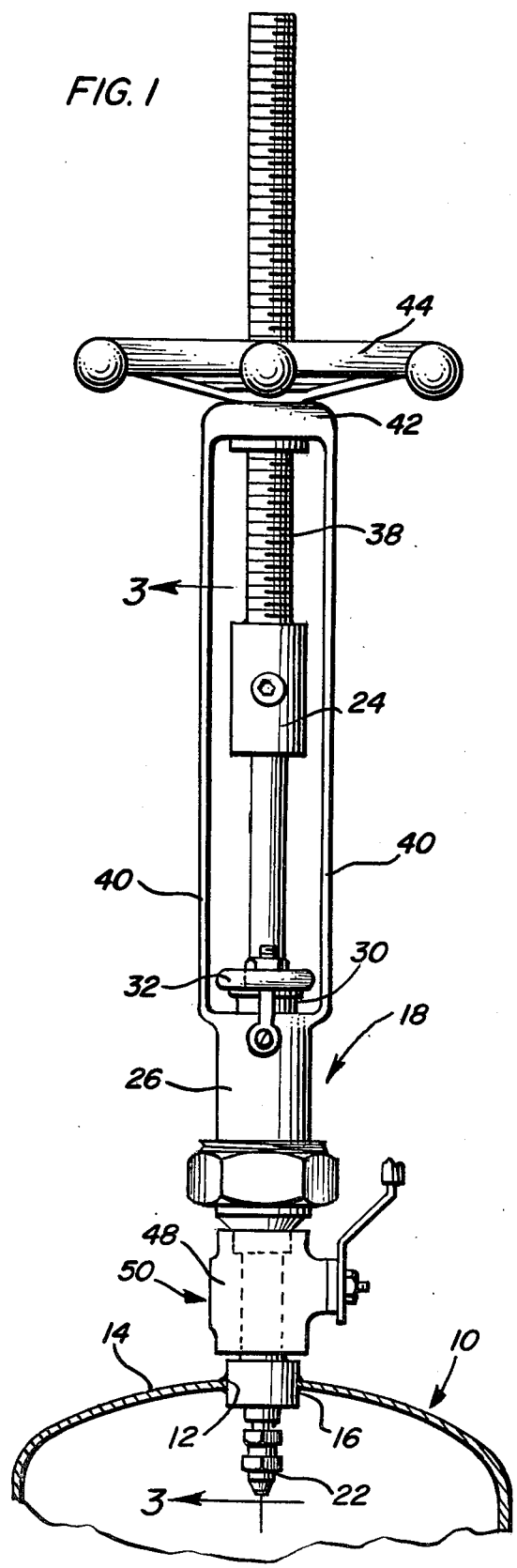
FIG. 1 is a side elevational view of the spray nozzle assembly of the instant invention in operative association with a pressurized vessel, portions of the vessel being fragmentarily illustrated in section.
Figure 2:
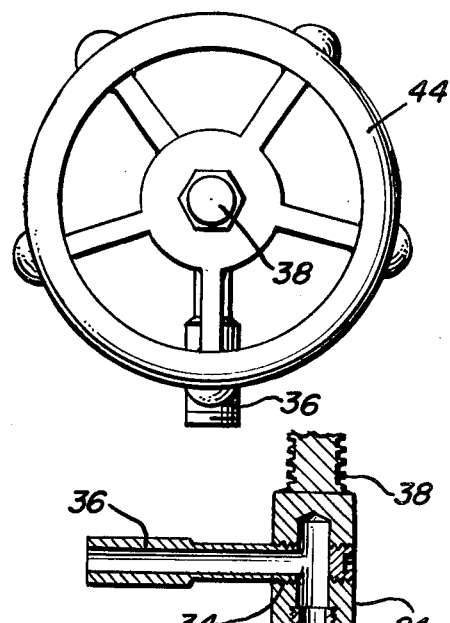
FIG. 2 is a top plan view of the spray nozzle.
Figure 3:
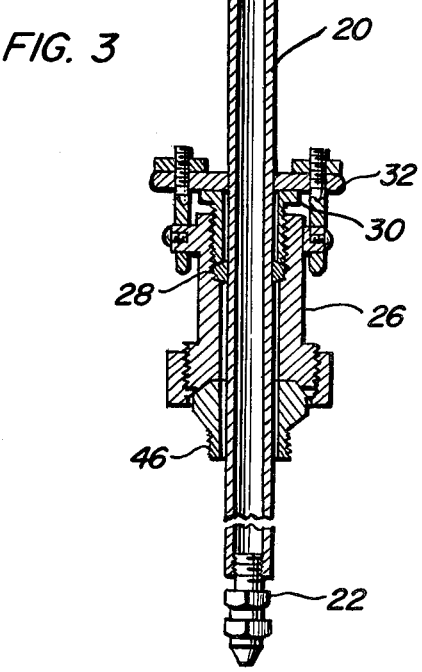
FIG. 3 is a fragmentary vertical sectional view taken substantially upon the plan indicated by the section line 3—3 of FIG. 1.

Referring now more specifically to the drawings the numeral 10 generally designates a pressurized vessel comprising a part of a natural gas processing plant. The vessel 10 includes an opening 12 formed through a top wall portion 14 thereof and an internally threaded cylindrical inlet port defining fitting 16 is sealingly secured within the opening 12.

The spray nozzle assembly of the instant invention is referred to in general by the reference numeral 18 and includes an elongated tubular wand 20 having a removable spray nozzle 22 on one end and a multiple port fitting 24 on the other end. An intermediate length portion of the wand 20 has a mounting sleeve 26 disposed thereabout and seal structure in the form of an axially compressible and radially expandable annular seal 28, a packing gland nut 30 and packing gland flange 32 forms a fluid type pressure seal between the external surfaces of the wand 20 and internal surfaces of the mounting sleeve 26. The wand 20 is longitudinally slidable and rotatable relative to the seal structure.

The fitting 24 includes a lateral port 34 in which an inlet fitting 36 is secured and the inlet fitting is adapted to be communicated with a valved source of glycol under pressure. In addition, the end of the fitting 24 remote from the wand 20 has one end of a jack screw 38 secured thereto with the jack screw 38 coaxial with the wand 20. Opposite side portions of the mounting sleeve 26 include elongated arms 40 formed integrally therewith and which parallel the wand 20 and project away from the nozzle equipped end of the wand. The free ends of the arms 40 support a tubular journal portion 42 therefrom and a hand wheel 44 is journalled from the journal portion 42 against axial displacement relative thereto and is threadingly engaged on the jack screw 38.

The end of the mounting sleeve 26 remote from the fitting 24 includes an externally threaded tubular mounting portion 46 removably threaded into the body 48 of a full opening and full closing valve 50 and the end of the valve body 48 remote from the mounting sleeve 26 is removably threaded in the inlet port defining fitting 16.

In operation, a pressurized glycol supply line (suitably valved) is communicated with the fitting 36 and when the wand 20 is projected through the fitting 16 the nozzle 22 is disposed within the vessel 10 and may be used to spray discharge glycol within the vessel 10. However, when it is desired to remove the nozzle 24 for replacement, the hand wheel 44 is operated to upwardly jack the wand 20 in order to withdraw the nozzle 22 from the vessel 10 and upwardly through the valve body 48. Then, the valve 50 may be closed and the threaded mounting portion 46 may be unthreaded from the body 48 in order to remove the spray nozzle assembly 18 from the valve 50 and allow ready replacement of the nozzle 22. After the nozzle 22 has been removed, the threaded mounting portion 46 is again threadedly engaged with the upper end of the body 48, the valve 50 is opened and the hand wheel 44 is rotated to downwardly project the nozzle 22 and the adjacent end of the wand 20 through the valve 50 and the inlet port defining fitting 16 into the vessel 10.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a closed vessel subject to internal pressure and including a wall portion through which a tubular fitting is sealingly secured, said fitting including opposite ends opening inwardly and outwardly, respectively, of said vessel, a retractable spray nozzle assembly, said assembly including a full opening and full closing valve defining a straight passage therethrough when said valve is fully opened, said valve being mounted from the outwardly opening end of said fitting with the latter co-extensive with said passage, a tubular mounting sleeve having one end mounted from said valve coaxial with the end of said passage remote from said fitting, diametrically opposite portions of said sleeve on the end thereof remote from said valve including a pair of elongated endwise outwardly projecting laterally spaced apart arms, a journal portion extending and connected between the ends of said arms remote from said sleeve, a hand wheel journaled from said journal portion against axial shifting relative thereto, an elongated jack screw threaded centrally through said hand wheel and including a first end disposed between said arms, facing toward said sleeve and co-axial therewith, a right-angle hollow fitting mounted on said one end of said jack screw including a first lateral port opening outwardly between said arms and a second port opening toward said sleeve and co-axial therewith, an elongated tubular wand having a first end portion rigidly and sealingly connected to said fitting about said second port and a second end portion, having a spray nozzle mounted thereon, slidingly received through said sleeve and projectable through and retractable from said passage, said sleeve including seal means establishing a sliding fluid tight seal between said wand and said sleeve, said first lateral port including an inlet fitting sealingly secured thereto and projecting outwardly between said arms.

2. The spray nozzle of claim 1 wherein said seal means includes an adjustably axially compressable and radially expandable angular seal member disposed about said wand within said sleeve.

* * * * *